July 14, 1953     H. T. STEVINSON     2,645,552
TRACE IDENTIFIER FOR OPTICAL OSCILLOGRAPHS
Filed Sept. 4, 1951     3 Sheets-Sheet 1
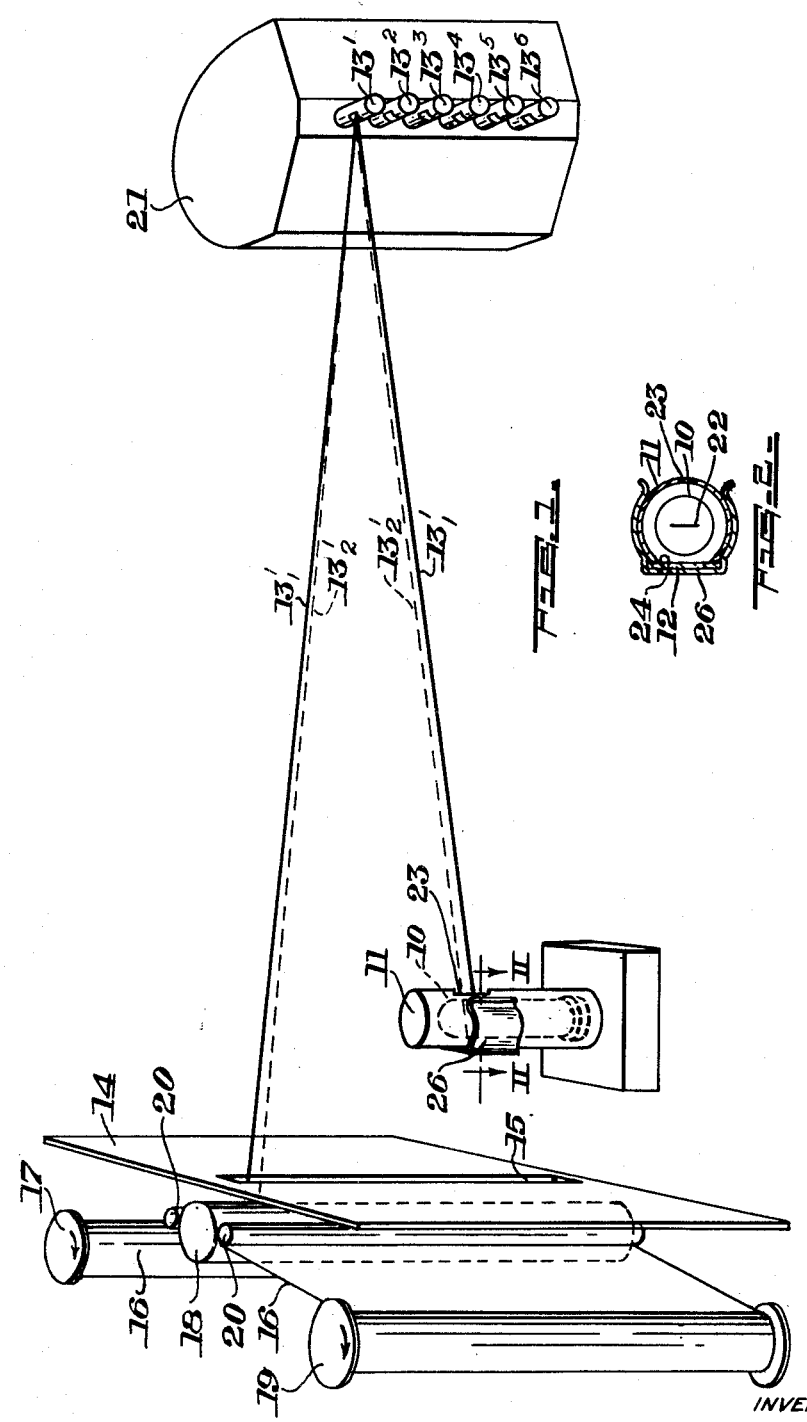
INVENTOR
HARRY T. STEVINSON
BY— Smart & Biggar
ATTORNEYS.

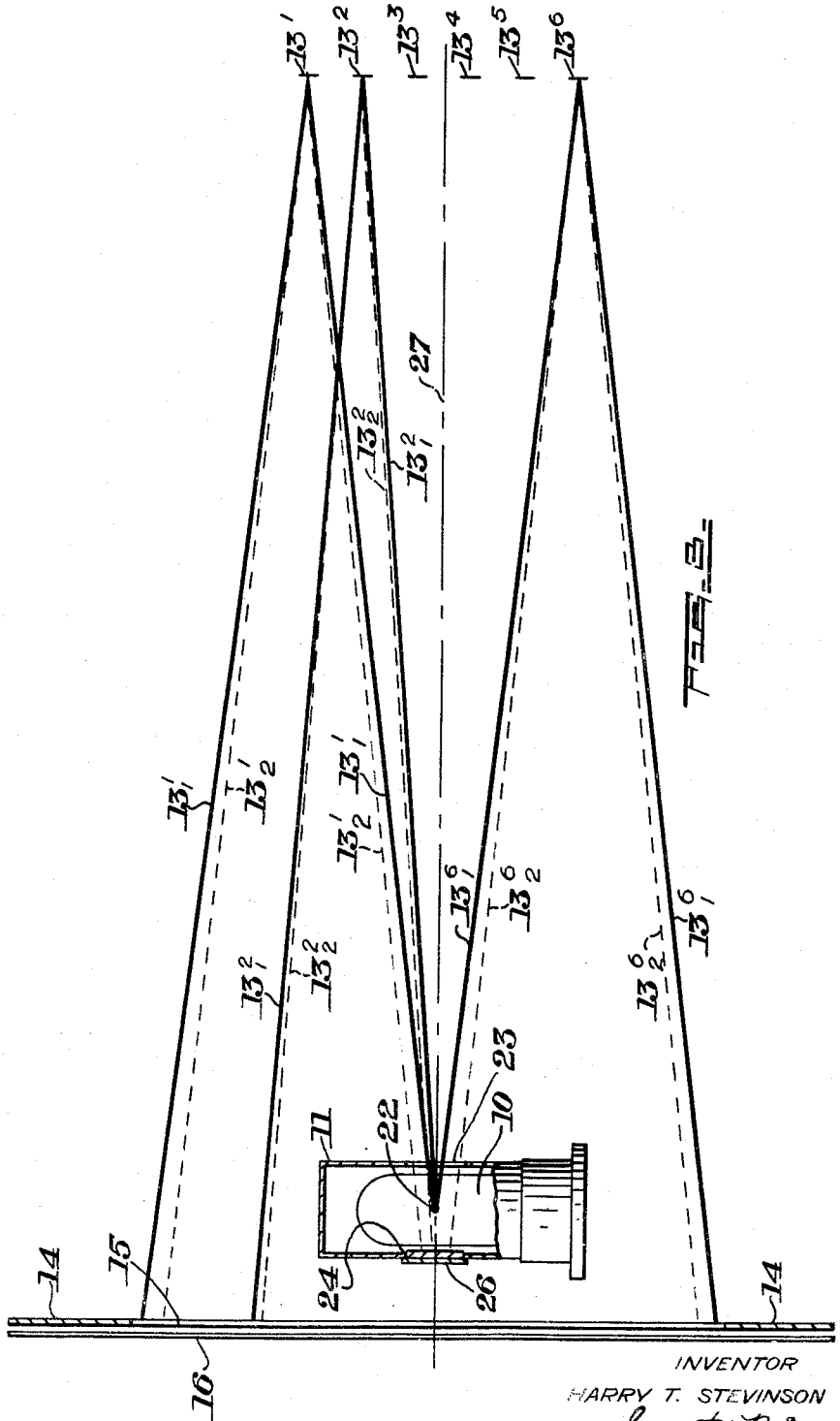

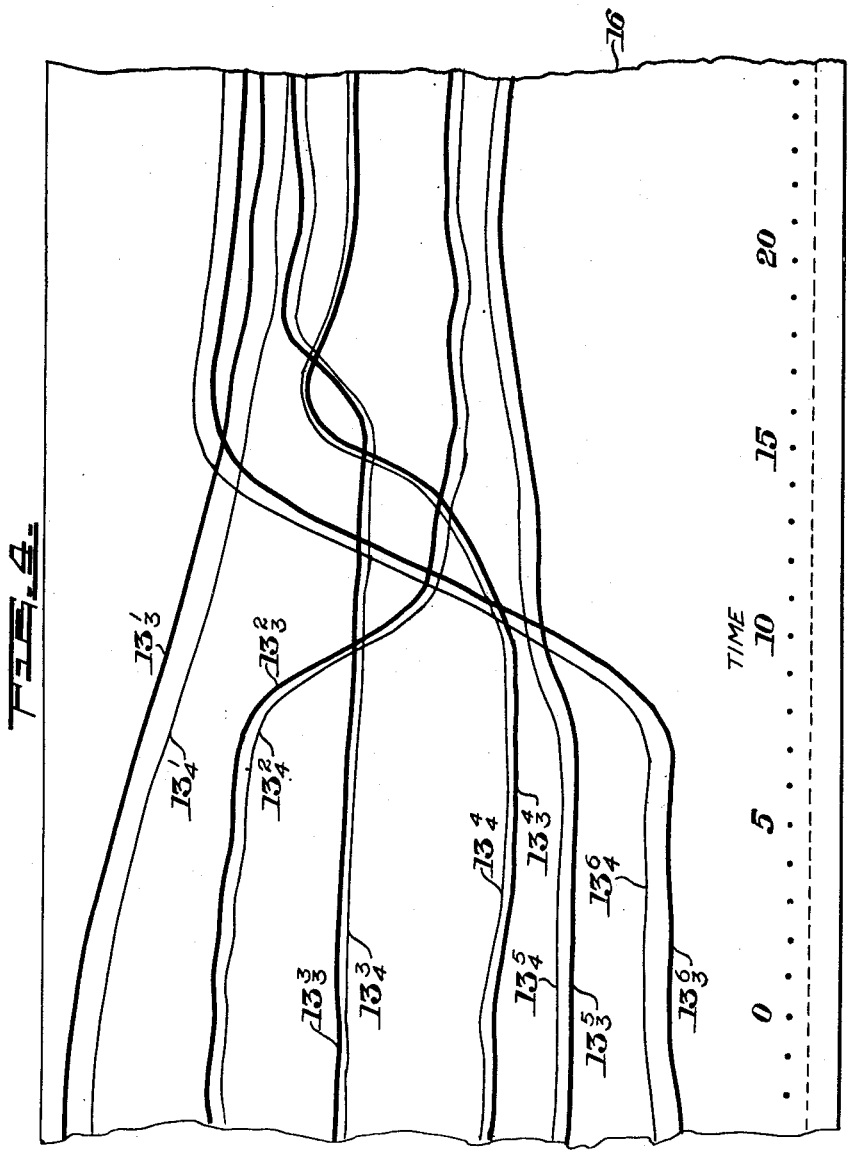

Patented July 14, 1953

2,645,552

UNITED STATES PATENT OFFICE 2,645,552

TRACE IDENTIFIER FOR OPTICAL OSCILLOGRAPHS

Harry T. Stevinson, Arnprior, Ontario, Canada, assignor to National Research Council, Ottawa, Ontario, Canada, a body corporate of Canada Application September 4, 1951, Serial No. 245,065

8 Claims. (Cl. 346—109)

The invention relates to apparatus for providing individual identification of the traces produced by a multi-channel optical oscillograph.

The term "optical oscillograph" is used in this specification to mean an oscillograph arranged to record a variable, or a plurality of variables, by means of light reflected by one or more mirror-motors. A mirror-motor is a mirror and a motor for rotating the mirror in response to a variable. The motor may be, for example, a galvanometer, a pressure capsule, an electric motor, a pendulum or a bimetallic strip.

A multi-channel optical oscillograph may be arranged to record several variables simultaneously, for example, six, nine, eighteen or more. Each variable is transformed into a light trace by a mirror-motor and may be recorded on moving photographic film. Movement of the film provides a time base for the traces, and each trace appears on the film as a line. Owing to several variables being recorded simultaneously on the same film, the lines representing them may become interlaced making it difficult to identify the trace which represents a given variable, as well as making it difficult, if not impossible, to follow any particular trace for any substantial distance along the film.

In one prior art arrangement for overcoming this difficulty, a toothed disc is provided for interrupting each light trace in succession so that by noting the sequence of interruptions of the traces, each trace can be identified. This arrangement requires rotating parts in the optical system of the oscillograph and consequently its complication, as well as the cost, size and weight of the apparatus, are increased. Another prior art arrangement for trace identification is to use colour sensitive film and to arrange a colour filter in the light path of each galvanometer so that the trace produced by each galvanometer results in a differently coloured line on the film. This arrangement greatly increases the cost of the equipment and requires the more involved techniques necessary for the development of colour sensitive film.

The present applicant has discovered that each individual trace produced by a multi-channel optical oscillograph can be positively identified throughout its length in a very simple manner by arranging a light reflecting mirror behind the light source so as to reflect an image of the light source to each mirror-motor. Due to reflection losses in the mirror, the reflected image will have less intensity than the light transmitted directly from the light source to each mirror-motor so that the trace produced on the film due to the reflected image is fainter and, therefore, has the appearance of a ghost of the main trace. Owing to a single light source being used to supply light to a plurality of mirror-motors, each subtending a different angle to the light source with reference to a reference plane extending through the light source (different either in magnitude or sign), the relation between each main trace and its ghost is different. In the case of mirror-motors located on the opposite side of the reference plane, the ghosts will appear on the opposite sides of the main traces. Therefore, each trace appearing on the film is uniquely identified by a ghost trace which can be followed through the various traces appearing on the film even though they are closely interlaced.

The invention will be further described with reference to the accompanying drawings illustrating certain embodiments of it, and in which:

Figure 1 is a perspective view of the optical system of a multi-channel optical oscillograph having a trace identifier according to the present invention;

Figure 2 is a cross sectional view taken on the line II—II of Figure 1;

Figure 3 is a diagram showing the light paths between the light source and the mirror-motors and between the mirror-motors and the film for the optical system shown in Figure 1; and Figure 4 shows a section of film having traces produced by an optical system such as is shown in Figure 1.

As shown in Figures 1 and 2, the optical system of a multi-channel optical oscillograph having a trace identifier according to the present invention comprises a light source in the form of a lamp 10, a light shield 11, a trace identifier mirror 12, a series of mirror-motors shown as reflecting galvanometers $13^1$–$13^6$ and a light mask 14 having a slit type aperture 15. The mirror-motors have their deflection axes extending horizontally and are spaced vertically with respect to each other. The slit 15 also is arranged vertically in mask 14. Photographic film 16 is arranged behind mask 14 and is driven past the slit 15 in a horizontal direction, the film being held by a supply roller 17, a drive roller 18, a takeup roller 19 and pressure rollers 20. The galvanometers $13^1$–$13^6$ are mounted in a magnet block 21 in the usual manner, and the complete system is enclosed in a light-tight case (not shown). In the drawings the galvanometers $13^1$–$13^6$ are shown arranged in a single straight line which is a convenient arrangement for that type of mirror-motor. In the case of another type of mirror-motors a different arrangement may be necessary due to their shape or size. For example, the mirror-motors could be staggered about a straight line in one or more planes providing a light path exists from the lamp 10 to each mirror and thence to the film 16.

As shown in Figure 2, the lamp 10 has a linear filament 22. The lamp 10 is mounted within a non-reflecting light shield 11 with its filament running at right angles to the row of galvanometers 13¹-13⁶ and at right angles to the slit aperture 15 of the light mask 14 so that the image of the lamp 10 which reaches the film 16 through reflection from a galvanometer mirror is a section only of the length of the filament as determined by the width of the slit aperture 15. The light shield 11 has a front aperture 23 and a rear aperture 24 arranged respectively before and behind the lamp 10. The rear aperture 24 has the mirror 12 held against it by a spring clamp 26. In Figure 1, only one main light path 13¹₁ and its ghost light path 13¹₂ (for the galvanometer 13¹) are shown, although there is a main light path and a ghost light path for each of the six galvanometers 13¹-13⁶. Each main light path extends from the lamp 10 to a galvanometer and to the film 16. Each ghost light path extends from the lamp 10 to the mirror 12, to a galvanometer and to the film 16.

It will be noted that, according to well-known laws of optics, the mirror 12 positioned behind the light source 22 acts in the same manner as if a second light source were positioned behind the filament 22 a distance equal to twice the distance from the mirror to the filament. In other words, the mirror 12 acting in conjunction with the light source 22 constitutes a second source of light spaced at a greater distance from the mirror-motors than the source 22.

In operation, for the case of the oscillograph having six galvanometers (six channels) as shown in Figures 3 and 4, there are six main light paths or axes 13¹₁-13⁶₁ and six corresponding ghost light paths or axes 13¹₂-13⁶₂ producing on the film six main traces 13¹₃-13⁶₃ and six ghost traces 13¹₄-13⁶₄. As shown in Figure 3 the galvanometers 13¹, 13² and 13³ are on one side of a reference plane 27 extending through the light filament 22 in all directions at right angles to the plane of the mirror 12 and the galvanometers 13⁴, 13⁵ and 13⁶ are on the other side of the reference plane, resulting in the main traces 13¹₃, 13²₃ and 13³₃ having their ghosts on opposite sides to those of the main traces 13⁴₃, 13⁵₃ and 13⁶₃. In this arrangement each trace can be identified as having been formed by the galvanometer of a particular channel by observing the relative distance perpendicularly to the direction of film travel between each main trace and its ghost trace. For example, the trace produced by the galvanometer 13³ can be followed along the film 16 by noting that because the galvanometer 13³ is the first one above the reference plane 27, its ghost trace 13³₄ will be below its main trace 13³₃ and the distance at right angles to the direction of film travel between the ghost trace 13³₄ and the main trace 13³₃ will be less than for any other main trace for which the ghost trace is in the lower position. If as mentioned above, the galvanometers 13¹-13⁶, or mirror-motors of another type, are not all in a straight line it is necessary to arrange them so that no two mirrors located at the same distance from the light source are at the same distance from the reference plane, as otherwise there would not be a distinctive spacing between the main trace and the ghost trace reflected by each mirror.

If the relative positions of the galvanometers 13¹-13⁶ and the lamp 10 were arranged so that all the galvanometers 13¹-13⁶ were on the same side of the reference plane 27 and at different distances from it, then all the ghost traces would be on the same sides of the main traces, and each main trace would be identified by simply noting the relative distances between each main trace and its ghost. In the case of a galvanometer being arranged with its mirror on the reference plane 27, that galvanometer would not produce a ghost trace, and its main trace would be so identified. As is ordinarily the case, it is necessary that the film speed suit the rate of change of the variables being recorded. If the traces become very steep, that is nearly vertical (see Figure 4), the spacings between the main traces and their respective ghost traces become very small and, to avoid this, the film speed should be increased.

The present invention can be applied to an oscillograph in which there is at least one series of galvanometers arranged on either side of a reference plane, each series being supplied with light from a different lamp. According to the invention, a mirror is fixed behind each lamp, and each lamp is set at a different distance from the reference plane so that any main trace, which has its ghost trace on the same side of it as any other main trace, has a different spacing from its ghost trace.

In the case of more than one light source being used, if ambiguity in the occasional case is to be avoided it may be necessary to adjust the location of the offending lamp or mirror motor until unique spacing of each ghost is restored.

The mirror used behind the lamp to produce the ghost traces may be an ordinary mirror having either front surface or rear surface reflection, but it is preferred that the mirror have a substantial amount of reflection losses so that the difference in intensity between the main traces and the ghost traces will be quite obvious. If necessary a filter can be used in front of the mirror to provide a desired amount of reflection losses.

As indicated by the drawings, the invention can be applied to an oscillograph in a simple manner, at a very small cost, and with results which provide a positive individual identification throughout the lengths of the traces, even though they may be closely interlaced.

What I claim as my invention is:

1. A multi-channel optical oscillograph comprising a light source, a record surface, a plurality of light-reflecting mirror-motors arranged to reflect images of said source onto said surface, said images being formed of light rays received by said mirror-motors directly from said source along a set of axes individual to said mirror-motors, and a light-reflecting mirror receiving light rays from said source and reflecting said rays onto said mirror-motors along a second set of axes individual to said mirror-motors and displaced with respect to said first set of axes, whereby two sets of spaced images are reflected from said mirror-motors onto said surface.

2. An oscillograph according to claim 1 wherein said light-reflecting mirror is a plane mirror positioned on the opposite side of said light source from said mirror-motors, and said mirror-motors are spaced at different distances from a reference plane passing through said light source at right-angles to the plane of said light-reflecting mirror.

3. An oscillograph according to claim 1 wherein said light-reflecting mirror is a plane mirror positioned on the opposite side of said light source from said mirror-motors, certain of said mirror-motors being located on one side of a reference plane passing through said light source at right angles to the plane of said light-reflecting mirror, and other mirror-motors being located on the opposite side of said reference plane.

4. An optical oscillograph comprising a light source, a record surface, a light-reflecting mirror-motor positioned to receive light rays directly from said source along a given axis and to reflect an image of said source onto said surface, and means positioned on the opposite side of said source from said mirror-motor forming a second source of light projecting light rays onto said mirror-motor along an axis displaced with respect to said given axis, whereby spaced images of said sources are reflected from said mirror-motor onto said surface.

5. An optical oscillograph comprising a light source, a record surface, a light-reflecting mirror-motor positioned to receive light rays directly from said source along a given axis and to reflect an image of said source onto said surface, and a light-reflecting mirror positioned to receive light directly from said source and to reflect an image of said source onto said mirror-motor along an axis displaced with respect to said given axis, whereby two spaced images of said source are reflected from said mirror-motor onto said surface.

6. Apparatus as defined in claim 5 in which the light reflecting mirror is a plane mirror having a substantial amount of reflection losses.

7. Apparatus as defined in claim 5 in which the light source is shielded by a non-reflecting light shield.

8. Apparatus as defined in claim 5 in which the light source is shielded by a non-reflecting light shield and the light reflecting mirror fixed behind said light source is fixed at an aperture in said light shield.

HARRY T. STEVINSON.

References Cited in the file of this patent

UNITED STATES PATENTS

| Number | Name | Date |
|---|---|---|
| 1,713,226 | Hall | May 14, 1929 |
| 1,792,013 | Hayes | Feb. 10, 1931 |
| 2,348,401 | Manzanera | May 9, 1944 |